(12) United States Patent
Saul et al.

(10) Patent No.: US 10,295,720 B2
(45) Date of Patent: May 21, 2019

(54) METHODS AND APPARATUS FOR CABIN LIGHTING FOR AIRCRAFT MAIN CABIN

(71) Applicant: THE BOEING COMPANY, Chicago, IL (US)

(72) Inventors: Kevin Saul, Los Angeles, CA (US); Peng Zeng, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 599 days.

(21) Appl. No.: 14/966,750

(22) Filed: Dec. 11, 2015

(65) Prior Publication Data

US 2017/0166118 A1    Jun. 15, 2017

(51) Int. Cl.
| | | |
|---|---|---|
| *B60Q 3/43* | (2017.01) | |
| *B60Q 3/66* | (2017.01) | |
| *B60Q 3/80* | (2017.01) | |
| *F21S 2/00* | (2016.01) | |
| *F21V 8/00* | (2006.01) | |
| *B64D 11/00* | (2006.01) | |
| *F21Y 103/00* | (2016.01) | |
| *F21Y 115/10* | (2016.01) | |

(52) U.S. Cl.
CPC .............. *G02B 6/001* (2013.01); *B60Q 3/43* (2017.02); *B60Q 3/66* (2017.02); *B60Q 3/80* (2017.02); *B64D 11/00* (2013.01); *G02B 6/0066* (2013.01); *G02B 6/0073* (2013.01); *G02B 6/0078* (2013.01); *G02B 6/0091* (2013.01); *B64D 2011/0038* (2013.01); *B64D 2011/0053* (2013.01); *B64D 2203/00* (2013.01); *F21S 2/00* (2013.01); *F21Y 2103/00* (2013.01); *F21Y 2115/10* (2016.08)

(58) Field of Classification Search
CPC .... B64D 2011/0038; B64D 2011/0053; G02B 6/001
See application file for complete search history.

(56) References Cited

U.S. PATENT DOCUMENTS

| | | | |
|---|---|---|---|
| 4,389,085 A | | 6/1983 | Mori |
| 5,333,227 A | * | 7/1994 | Ishiharada ........... G02B 6/0001 385/100 |
| 5,647,658 A | * | 7/1997 | Ziadi ..................... B64D 11/00 362/471 |
| 6,104,857 A | * | 8/2000 | Ishiharada ............... B60Q 1/26 385/123 |

(Continued)

FOREIGN PATENT DOCUMENTS

| | | |
|---|---|---|
| WO | 2004023181 A1 | 3/2004 |
| WO | 2008129836 A1 | 10/2008 |

OTHER PUBLICATIONS

Extended European Search Report dated Apr. 7, 2017 for Application No. 161963863.1757.

*Primary Examiner* — William N Harris
(74) *Attorney, Agent, or Firm* — Patterson + Sheridan, LLP (57) ABSTRACT

Embodiments disclosed herein generally relate to lighting an interior of an enclosure using light emitting diodes (LEDs). In one example, a lighting system is provided. The lighting system includes one or more selective light directors having one or more point sources of light disposed along a length of the selective light director, a circuit board coupled to at least one end thereof, and a light emitting diode directing light into the selective light director.

22 Claims, 5 Drawing Sheets

(56) References Cited

U.S. PATENT DOCUMENTS

| | | | |
|---|---|---|---|
| 7,512,300 B2 * | 3/2009 | Robertson | G02B 6/0006 |
| | | | 362/630 |
| 2004/0012979 A1 | 1/2004 | Squicciarini | |
| 2004/0032747 A1 | 2/2004 | Currie et al. | |
| 2007/0071393 A1 * | 3/2007 | Robertson | G02B 6/0006 |
| | | | 385/101 |
| 2011/0075441 A1 | 3/2011 | Swessel et al. | |
| 2011/0103757 A1 * | 5/2011 | Alkemper | C03B 37/01211 |
| | | | 385/124 |
| 2012/0044666 A1 | 2/2012 | Buelow et al. | |
| 2013/0314940 A1 * | 11/2013 | Russert | C03B 37/01222 |
| | | | 362/556 |
| 2014/0078772 A1 | 3/2014 | Gaydoul et al. | |
| 2017/0031077 A1 * | 2/2017 | Gaydoul | F21S 43/13 |

\* cited by examiner

METHODS AND APPARATUS FOR CABIN LIGHTING FOR AIRCRAFT MAIN CABIN

BACKGROUND

The aircraft industry has recently shifted towards light emitting diode (LED) technology for aircraft interior lighting solutions. LED technology has advantages in both energy consumption and the ability to utilize the full visible spectrum, which provides dynamic light scene changes that may enhance customer experience. In larger, wide body aircraft, there are typically eight rows of lights in any cross section of the main cabin, and 6 rows of lights in any cross section of the main cabin of a narrow-body aircraft. Each row consists of lights of different lengths across more than 70% of an aircraft's length. However, LEDs typically have a narrower beam angle than conventional incandescent lights and thus cannot spread light as efficiently as incandescent lights. Thus, LEDs are typically spaced very close to each other. Further, the conventional LEDs utilized today are coupled to long printed circuit boards (PCBs) that serve as a mount and a controller for the LEDs. The PCBs are expensive and the large number of the PCBs adds weight to the aircraft.

What is needed is a method and apparatus for lighting an aircraft interior utilizing LED technology.

SUMMARY

The present disclosure generally relates to lighting an aircraft interior using light emitting diodes (LEDs). In one example, a lighting system is provided. The lighting system includes one or more selective light directors having one or more point sources of light formed along a length of the selective light director, a circuit board coupled to at least one end of the selective light director, and a light emitting diode directing light into the selective light director.

In one example, a lighting system is provided and includes one or more selective light directors having one or more point sources of light disposed along a length of the selective light director, a circuit board coupled to at least one end thereof, and a light emitting diode directing light into the selective light director.

In another example, a lighting system is provided that includes one or more selective light director assemblies. Each of the selective light director assemblies comprise a selective light director coupled to a circuit board, the selective light director including a core at least partially surrounded by a cladding and having one or more point sources of light formed along a length of the selective light director, and a light emitting diode coupled to the circuit board and directing light into the selective light director on at least one end thereof.

In another example, a lighting system is provided that includes a plurality of selective light director assemblies disposed along a length of a cabin, the plurality of selective light director assemblies comprising two side wall selective light directors, a ceiling selective light director and four cross-bin selective light directors, each of the selective light directors being coupled to a circuit board and a light emitting diode directing light into the selective light director, wherein at least a portion of the side wall selective light directors comprise a reflector region and at least a portion of one or all of the side wall selective light directors, the ceiling selective light director and the cross-bin selective light directors comprise one or more point sources of light.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, common words have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to lighting an aircraft interior using light emitting diodes (LEDs). In one example, a lighting system is provided. The lighting system includes one or more selective light directors having one or more point sources of light formed along a length of the selective light director, a circuit board coupled to at least one end of the selective light director, and a light emitting diode directing light into the selective light director. The selective light directors may include a structure that emits light at an angle that is different than the longitudinal axis (e.g., a length) of the selective light director. The selective light directors are utilized to direct or throw light onto or into specific areas of an enclosure, such as a fuselage of an aircraft. The selective light director may comprise a point source of light that includes a structure or structures that selectively directs light to a desired area or areas of an enclosure at an angle that may be substantially normal to the longitudinal axis of the selective light director. The selective light directors may include one or a combination of structures as described below. In one example, the selective light directors may include a notch or blind hole formed in the selective light director, a reflector region that reflects and/or redirects light to emit at a specific location on the length of the selective light director, removal of a portion of a cladding disposed about the selective light director, or combinations thereof. A single selective light director may be used with one or more LEDs to illuminate multiple areas within an enclosure. In this manner, a selective light director may replace multiple LEDs with a single LED and illuminate a similar or larger area or volume within an enclosure.

Figure 1:
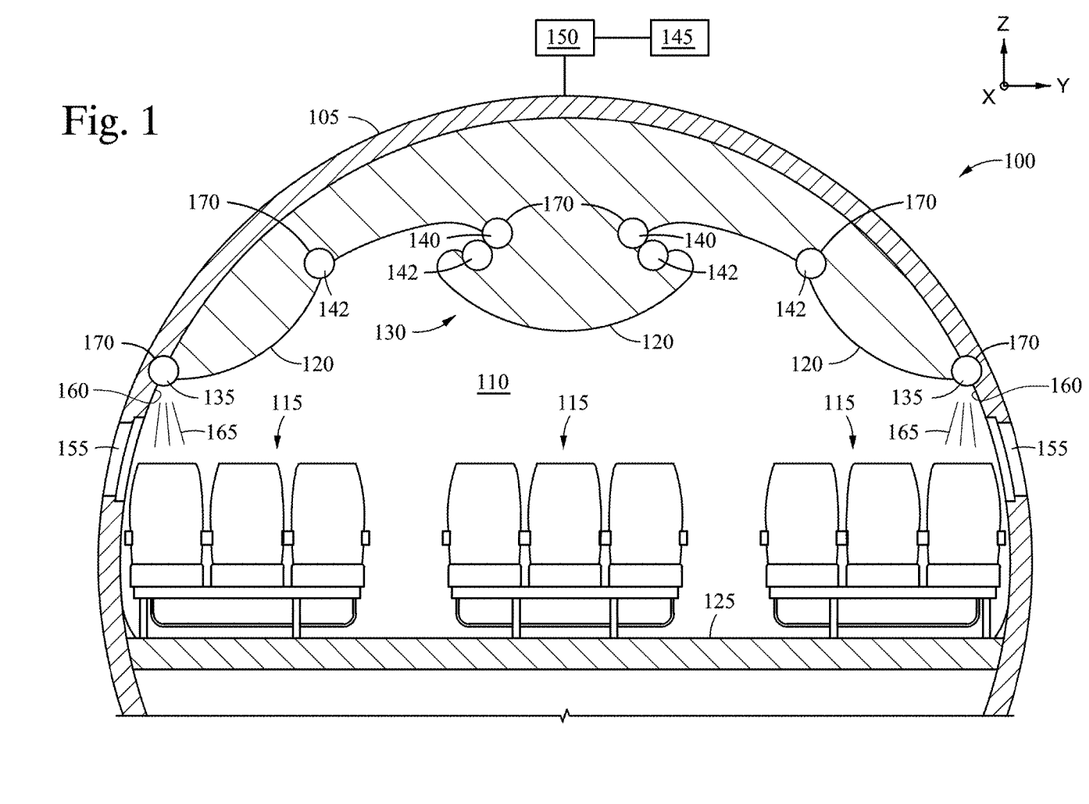
FIG. 1 is a cross-section of a fuselage of an aircraft having a cabin lighting system.

FIG. 1 is an aircraft 100 having a fuselage 105 shown in cross-section. The fuselage 105 includes a main cabin 110 having seats 115 in rows positioned laterally (in the Y direction) and the rows repeat along a length of the fuselage 105 (in the X direction). Luggage bins 120 are positioned above the seats 115 and may extend along the length of the fuselage 105 above the seats 115. Lighting is provided in the main cabin 110 for illuminating areas around the seats 115 as well as the area adjacent to the luggage bins 120. For example, a cabin lighting system 130 is provided adjacent to the luggage bins 120 and/or above the seats 115. The cabin lighting system 130 may be illuminated during boarding and deplaning of the aircraft 100 as well as during at least a portion of a flight. The cabin lighting system 130 may be turned off or dimmed for long durations during a flight to allow passengers to sleep. The cabin lighting system 130 may also be utilized as a dynamic lighting system creating visual effects that may enhance passenger's experience on the aircraft 100.

The cabin lighting system 130 includes two general types of lights shown as sidewall lights 135, and ceiling lights 140 and cross-bin lights 142. Each of the sidewall lights 135, the ceiling lights 140 and the cross-bin lights 142 may be multiple light strings that run along the length of the fuselage 105 (in the X direction). Each of the sidewall lights 135, the ceiling lights 140 and the cross-bin lights 142 may be powered by an onboard power source 145 and be in electrical communication with an on-board controller 150. The on-board controller 150 may control the sidewall lights 135, the ceiling lights 140 and the cross-bin lights 142 individually or collectively. In some examples, the sidewall lights 135, the ceiling lights 140 and the cross-bin lights 142 are controlled separately by the controller 150. In other aspects, the sidewall lights 135, the ceiling lights 140 and the cross-bin lights 142 may be controlled by the controller 150 in sections along the length of the fuselage 105. For example, each of the sidewall lights 135, the ceiling lights 140 and the cross-bin lights 142 may be divided into discrete sections or subsections along the length of the fuselage 105 that may be controlled independently. The sectional control of the sidewall lights 135, the ceiling lights 140 and the cross-bin lights 142 may be used to provide a spectacular lighting scene or lighting scenarios that may enhance passenger experience. The onboard power source 145 may be alternating current (AC) or direct current (DC). In one example, the onboard power source 145 is an existing power bus on the aircraft 100, such as 115 Volt AC bus.

A larger illuminated area may be achieved with only two light emitting diodes (LEDs), with a similar luminance level to the current lighting level, with brighter and higher powered LEDs, without the need to convert the voltage to use ~2-4 VDC for the current LEDs or to use a remote power supply. This allows running the lighting directly off of the aircraft bus voltage, e.g., 115 VAC, resulting in a power supply savings, as there will neither be a reason to convert AC current to DC current nor to require the same type of circuitry to distribute the power. Further, there is a weight savings and this also means less heat is generated, which reduces thermal impact to the surrounding area.

In this example, the sidewall lights 135 are positioned above windows 155 in the fuselage 105. The sidewall lights 135 project light down along sidewalls 160 of the main cabin 110 along an illumination direction 165. The illumination direction 165 gives passengers the appearance of a larger space as well as providing more illumination and visibility within the main cabin 110. One objective of the sidewall lights 135 is to illuminate the adjacent immediate space, which means that uniform and even dispersion of light across the length of the sidewall 160 is the goal, rather than projecting the light over a long distance (such as the case with the ceiling lights 140).

The ceiling lights 140 and the cross-bin lights 142 have a different purpose than the sidewall lights 135. Rather than immediate and adjacent illumination provided by the sidewall lights 135, the objective of the ceiling lights 140 and the cross-bin lights 142 is to "throw" the light to specific areas of the main cabin 110 and provide directed, albeit uniform, light. The ceiling lights 140 work to create the illusion of a larger space overhead. The cross-bin lights 142, while contributing to this effect, primarily illuminate the luggage bins 120 on the side opposing the position of the respective cross-bin light 142 (e.g., the luggage bin 120 across the aisle from a cross-bin light 142). Each of the sidewall lights 135, the ceiling lights 140 and the cross-bin lights 142 may be disposed in a housing 170 that is coupled to the luggage bins 120 or the sidewalls 160. The housings 170 may be continuous or discontinuous along the length of the fuselage 105.

Figure 2A:
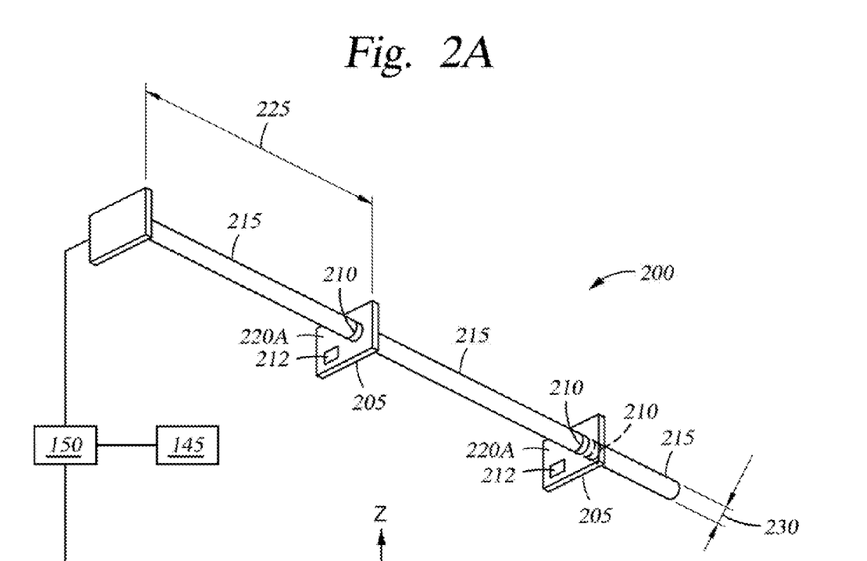
FIGS. 2A and 2B are schematic perspective views of examples of a light string assembly that may be used as the sidewall lights, the ceiling lights and the cross-bin lights of FIG. 1.
Figure 2B:
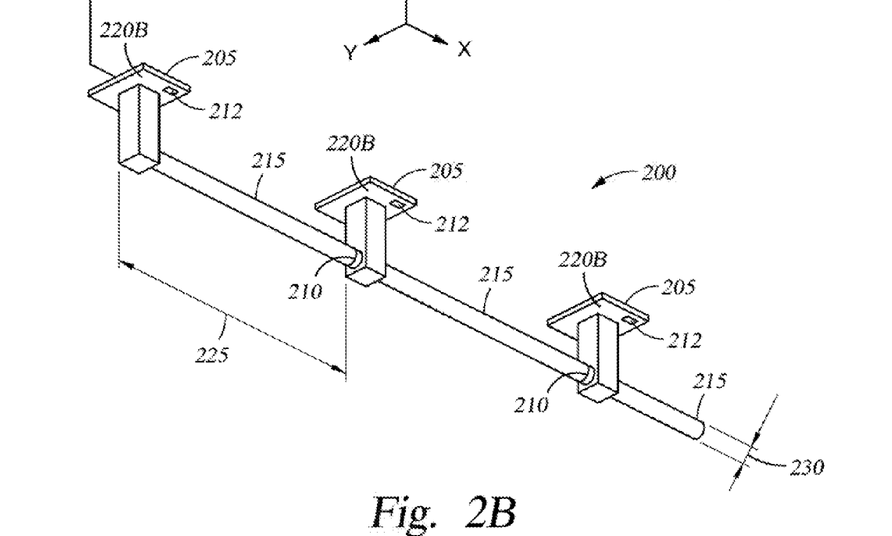

FIGS. 2A and 2B are schematic perspective views of examples of a light string assembly 200 that may be used as the sidewall lights 135, the ceiling lights 140 and the cross-bin lights 142 of FIG. 1. Each of the light string assemblies 200 include a plurality of circuit boards 205 each having at least one LED 210 that operates with 110-120 VAC. For example, the LED 210 may have a wattage of about 8 Watts to about 27 Watts and operate with 115 VAC. The LED 210 may emit white light, blue light, red light, green light, yellow light, or combinations thereof. For example, the LED 210 may be a multi-color LED. The circuit boards 205 may include a heat sink 212 that is utilized to dissipate heat from therefrom during use of the light string assembly 200. The light string assemblies 200 utilize fiber optic technology by emitting light from the at least one LED 210 along a light string 215, also referred to as a selective light director, disposed between at least a portion of the circuit boards 205. On the circuit boards 205 between the light strings 215, an LED 210 may be included on both sides of the circuit board 205 to provide light to both ends of the light string 215. The difference between the light strings 215 shown in FIGS. 2A and 2B are the orientation of the circuit boards 205 relative to a length of the light strings 215 (in the X direction). In FIG. 2A, a major surface 220A of the circuit boards 205 is orthogonal to the length of the light strings 215 while a major surface 220B of the circuit boards 205 is parallel to the length of the light strings 215. A length 225 of each of the light strings 215 between the circuit boards 205 may be about 40 inches and a diameter 230 of the light strings 215 may be about 0.13 inches to about 0.25 inches. The size of the circuit boards 205 allow the light string assemblies 200 to be easily installed into existing housings on an aircraft, such as the housings 170 of FIG. 1. The light strings 215 may be rigid or flexible such that the light strings 215 are bendable into curves or radii and thus conform to bends of walls or other structures. Suitable commercially available light strings that may be modified according to aspects described herein may include light strings sold under the trade name Ray Milky Flex by the 3M Company of St. Paul, Minn.

The number of light strings 215 coupled together will depend on the size and/or length of the individual light strings 215 and the aircraft configuration. Multiple light strings 215 could be strung in series or, in order to maintain brightness, strung in parallel. In some configurations, only a single light string 215 may be used to illuminate a small area.

Conventionally, the LED lighting systems on an aircraft include a rigid printed circuit board (PCB) having conventional LEDs mounted thereon. The rigid PCBs have varying lengths such as 12 inches, 20 inches, 35 inches, 40 inches and 50 inches having a varying number of conventional LEDs mounted thereon. Conventionally, about 2-4 LEDs are powered by a single power supply (converting AC to about 2-4 Volts DC). In the conventional lighting systems, the number of LEDs per length and hence the number of power supplies must be taken into consideration. However, the light string assemblies 200 as described herein are powered directly by the aircraft's bus voltage so the only consideration will be the frequency of electrical connections (e.g., terminals or outlets) along the length of the aircraft.

Due to the different illumination requirements of the sidewall lights 135 as compared to the ceiling lights 140 and the cross-bin lights 142 of FIG. 1, the construction of each may be different as described below. In addition, one or any combination of the sidewall lights 135, the ceiling lights 140 and the cross-bin lights 142 of FIG. 1 may be replaced by a single light string assembly utilizing diffused light in conjunction with structures in the light string to function as a selective light director as described herein. The selective light director may illuminate an area while also directing light onto or into specific areas, such as the sidewall and/or bins disposed in the fuselage 105. In some examples, the sidewall lights 135, the ceiling lights 140 and the cross-bin lights 142 on the port side and/or the starboard side of the fuselage 105 may be replaced by a single light string utilizing diffused light in conjunction with structures in the light string to function as a selective light director as described herein.

Figure 3A:
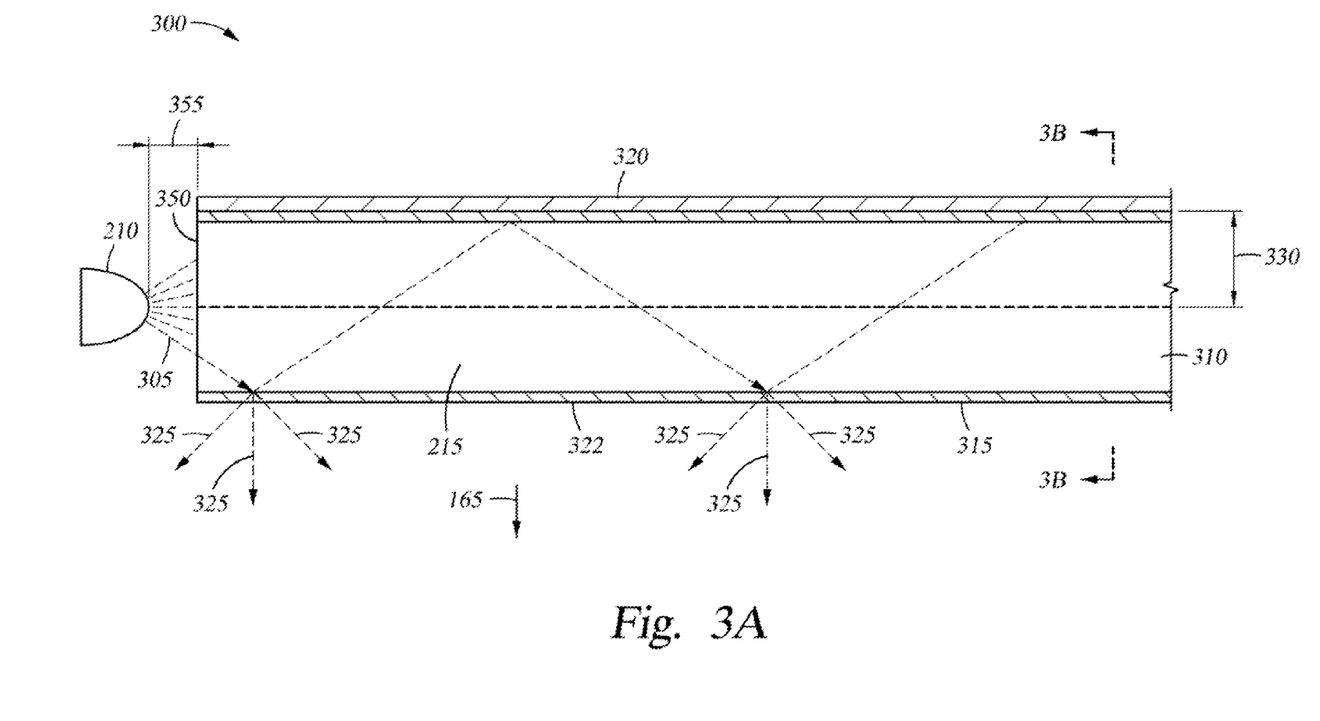
FIG. 3A is a side cross-sectional view of a light string according to one example that may be used as the light string assemblies of FIG. 2A or FIG. 2B.
Figure 3B:
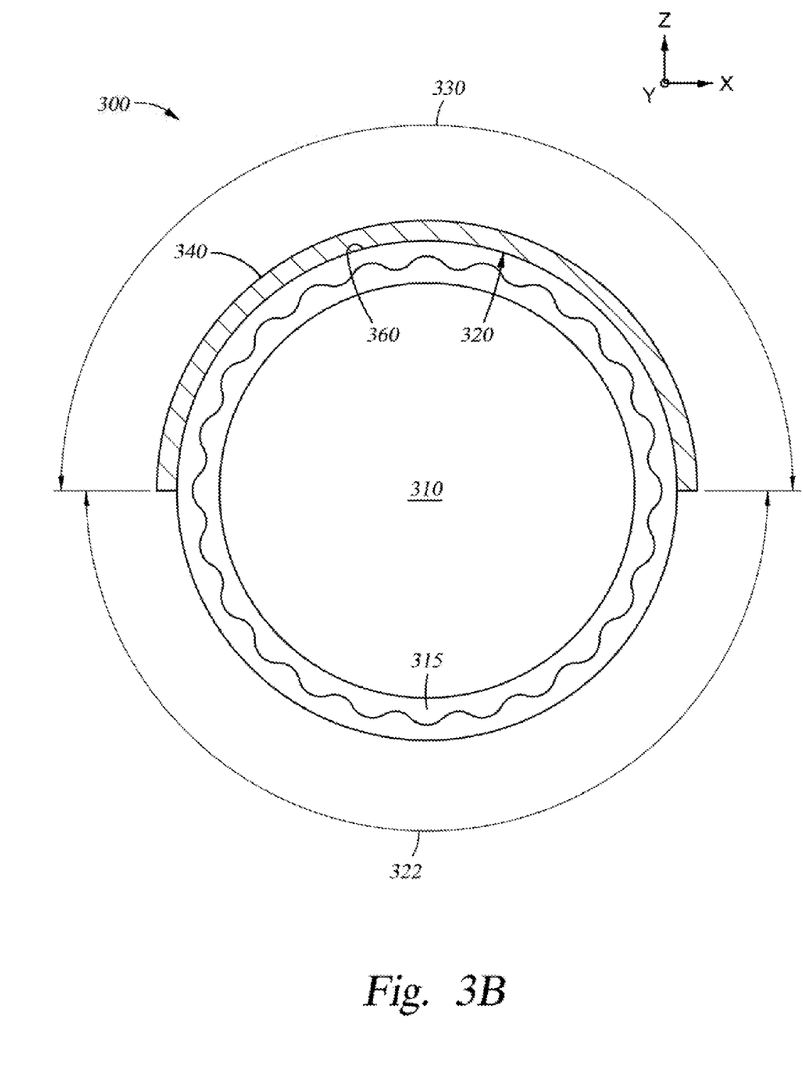
FIG. 3B is a cross-sectional view of the light string along lines 3B-3B of FIG. 3A.

FIGS. 3A and 3B are various views of an exemplary portion of a light string assembly 300 that may be used as the light string assemblies 200 of FIG. 2A or FIG. 2B. The light string assembly 300 may be particularly useful for the sidewall lights 135 of FIG. 1. The light string assembly 300 includes the light string 215 which includes an LED 210 emitting primary light 305 that is diffused along a length of the light string 215. The light string assembly 300 utilizes fiber optic technology to achieve total internal reflection of the primary light 305, thus carrying light along the entire length of the light string 215. The light string 215 includes a core 310 that is made of a material that is transparent to light from the LED 210. In one example, the core 310 may be a transparent plastic such as polymethyl methacrylate (PMMA). An outer surface of the core 310 is at least partially surrounded by a cladding 315, which may be a fluoropolymer material. In this example, at least a portion of the light string 215 includes a reflective surface 320.

As discussed above, the sidewall lights 135 are configured to direct light 305 along the illumination direction 165 (generally along an X-Z plane). The cladding 315 may have a slightly lower index of refraction than the core 310 which provides for the diffuse spreading of light along the length of the light string 215. In one example, the core 310 has a reflective index of about 1.48 while the cladding 315 has a reflective index of about 1.34. As an example of diffusion, primary light 305 enters the core 310 and a portion of the primary light exits the core 310 and the cladding 315 at a light emitting region 322 as diffused light 325. Other waves or photons of the primary light 305 are internally reflected within the core 310 along the length of the light string 215. A portion of the primary light 305 within the core 310 is reflected by the reflective surface 320, which prevents light from exiting a reflector region 330 of the light string 215 opposing the light emitting region 322 of the light string 215. The reflective surface 320 also directs a portion of the primary light 305 to exit the core 310 and the cladding 315 as diffuse reflected light at the light emitting region 322.

In some examples, the LED 210 may be in proximity to an end 350 of the core 310, or be spaced away from an end 350 of the core 310 as shown in FIG. 3A which may after the amount of primary light 305 that enters the core 310. For example, the LED 210 may be spaced from the end 350 by a distance 355, which may be 0 millimeters (e.g., in contact with the core 310) up to a few millimeters.

FIG. 3B is a cross-sectional view of the light string 215 along lines 3B-3B of FIG. 3A. In this example, the cladding 315 surrounds a peripheral surface 360 of the core 310, and the reflective surface 320 covers a portion of the cladding 315 in the reflector region 330. In another example, the cladding 315 may only partially cover the core 310, such that only the light emitting region 322 is surrounded by the cladding 315, and the reflective surface 320 is adhered directly to the peripheral surface 360 of the core 310 in the reflector region 330. In another example, the cladding 315 may be in the form of a tube or sleeve that is separable from the core 310, or a resin that is applied to the core 310. In this example, the reflective surface 320 may be adhered to the core 310 directly and the cladding 315 may be disposed over the reflective surface 320 and the core 310, or only the portion of the core 310 that does not include the reflective surface 320. The reflective surface 320 may be a coating or a reflective film 340 comprising a material having an index of refraction greater than an index of refraction of the core 310 and the cladding 315. Utilization of the reflective film 340 results in light waves escaping the light emitting region 322 of the light string 215 in the illumination direction 165 and not the reflector region 330. The achieved lighting effect is more directed and brighter lighting as compared to an uncoated light string. In the case of the sidewall lights 135 described in FIG. 1, diffused light 325 and diffuse reflected light is projected downward along the sidewalls 160 of the main cabin 110 while no light is emitted at the reflector region 330. The reflector region 330 may cover about one-quarter, one-half, three-quarters, or any percentage of the circumferential surface area of the light string 215 with the remaining circumferential portion having the light emitting region 322.

Utilization of the reflective surface 320 may also provide a structure where the light string 215 functions as a selective light director. For example, one or more discrete sections of the reflective surface 320 may be disposed along a length of the light string 215 (in the Y direction) to provide a point source of light associated with each section having the reflective surface 320. The reflected light from the reflective surface 320 may be brighter and/or more concentrated than the light emitted from the remainder of the light string 215. Additionally or alternatively, a portion of the cladding 315 may be removed to provide a structure where the light string 215 functions as a selective light director. For example, a portion of the cladding 315 on the light emitting region 322 may be removed to provide a point source of light concentrated at the position of the removed cladding 315. In some examples, the cladding 315 may be removed at specific positions along a length of the light string 215 (in the Y direction) to provide a point source of light corresponding to the positions of the removed cladding 315. The light emitted at the positions of the removed cladding may be brighter than the diffuse light emitted from the light string 215 where the cladding 315 exists.

One exemplary method for making the light string 215 includes holding or clamping the light string 215 (with the core 310 surrounded by the cladding 315) at each end, stretching the light string 215 between the two points such that the light string 215 is straight, and dipping a portion of the light string 215, such as one-half of the light string 215, into a tub that is prepared with a highly reflective and glossy paint that has a mirror-like or chrome finish. Once dried, there will be a thin layer of reflective film 340 on the bottom-half of the cladding 315. Thus, the bottom-half interface of the light string 215 is core 310/cladding 315/ reflective film 340 instead of core 310/cladding 315, which allows the emitted light to be redirected into the illumination direction 165.

Another exemplary method could be utilized before the cladding 315 is provided over the core 310. This method includes holding or clamping the core 310 at each end, stretching the core 310 between the two points such that the core 310 is straight, and dipping a portion of the core 310, such as one-half of the core 310, into a tub that is prepared with a highly reflective and glossy paint that has a mirror-like or chrome finish. Once dried, there will be a thin layer of reflective film 340 on the bottom-half of the core 310. The cladding 315 may then be applied to cover the core 310. If the cladding 315 is a tube or a sleeve, the core 310 may be inserted into the cladding 315 and the cladding 315 may be heat shrunk over the core 310. If the cladding 315 is a resin, the resin may be applied to cover at least the light emitting region 322 of the core 310.

Figure 4:
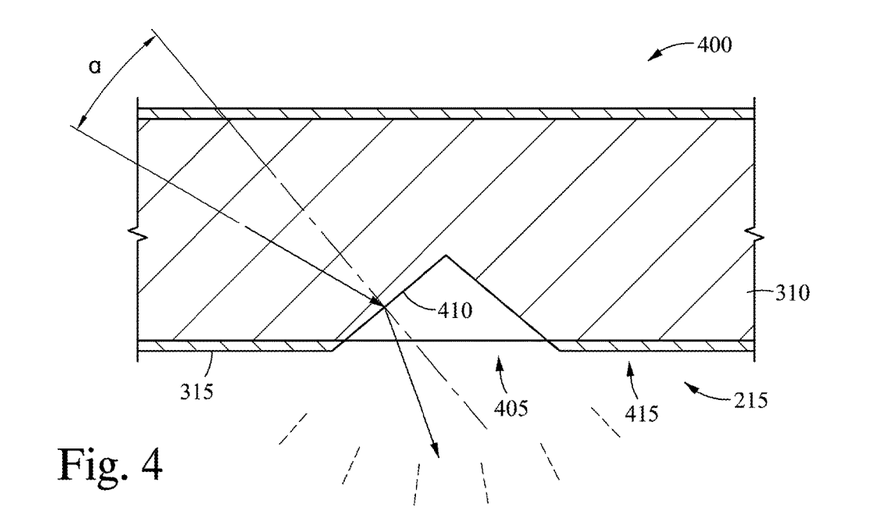
FIG. 4 is a side cross-sectional view of an example of a portion of a light string assembly that may be used as the light string assemblies of FIG. 2A or FIG. 2B.

FIG. 4 is a side cross-sectional view of an example of a portion of a light string assembly 400 that may be used as the light string assemblies 200 of FIG. 2A or FIG. 2B. The light string assembly 400 may be particularly useful for the ceiling lights 140 and the cross-bin lights 142 of FIG. 1.

The light string assembly 400 includes the light string 215 having the core 310 and the cladding 315 similar to other examples as described herein. However, the light string 215 is modified to include a point source of light 405 as another example of achieving a selective light director. It is to be understood that selective light directors may include a notch or blind hole formed in the selective light director, a reflector region that reflects and/or redirects light to emit at a specific location on the length of the selective light director, removal of a portion of a cladding disposed about the selective light director, or combinations thereof, forming one or more point source of light 405. The point source of light 405 is produced by a notch 410 formed in a surface 415 of the light string 215. The notch 410 may be a partial opening formed in the core 310 and/or the cladding 315 of the light string 215. In one example, the notch 410 may be a blind hole formed in the core 310 by a drill bit.

Dimensions of the notch 410 (i.e., a diameter of the notch 410 at the surface 415 and/or a depth of the notch 410 from the surface 415) and the angle of the walls of the notch 410 may optimized using Snell's law to determine the directionality and/or the refraction of the light emitted at the notch.

The notch 410 can be replicated along the length of the light string 215, in any position as needed to provide multiple point sources of light 405 along the light string 215. A single high power LED, such as the LED 210 described in FIG. 2, can provide multiple point sources of light 405 along a length of the light string 215. Optionally, the multiple point sources of light 405 may be formed in different positions around the circumference of the light string 215 providing point sources of light in selected, e.g., different, illumination direction(s). Each of the point sources of light 405 may be brighter than the diffuse light emitted from the light string 215 where no notches exist. One method of forming the notch 410 may be simply drilling a conical hole into the surface 415 of the light string 215. This may emulate the conical nature of an LED bulb's emission even more closely.

Figure 5:
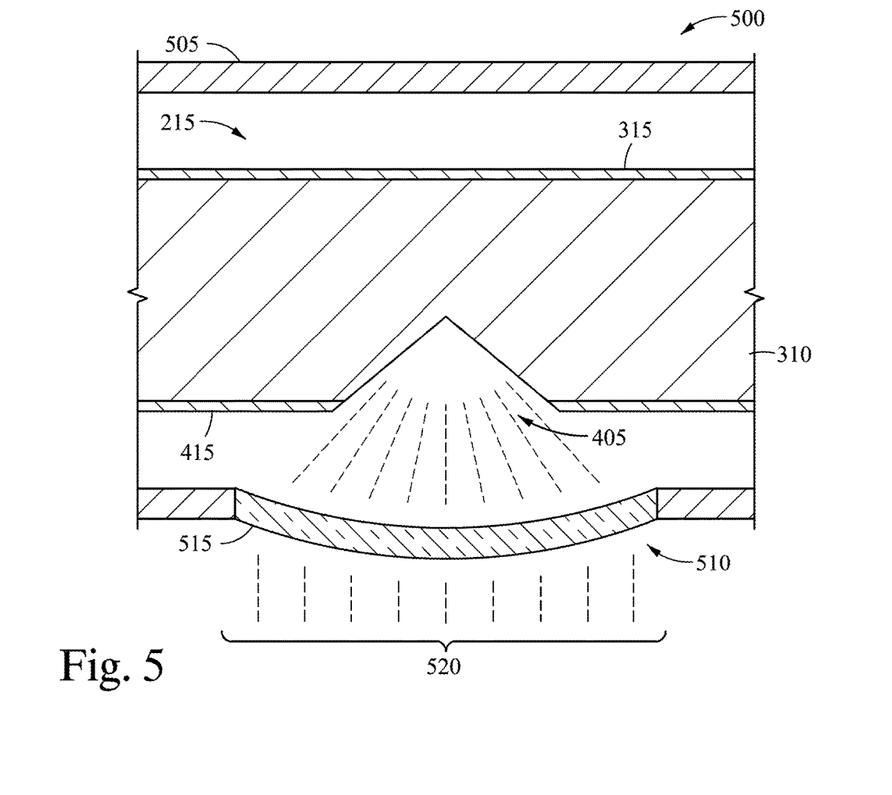
FIG. 5 is a side cross-sectional view of an example of a portion of a light string assembly that may be used as the light string assemblies of FIG. 2A or FIG. 2B.

The point source of light 405 may also be incorporated into existing aircraft lighting systems for the ceiling lights 140 and the cross-bin lights 142 of FIG. 1 as exemplarily described in FIG. 5.

FIG. 5 is a side cross-sectional view of an example of a portion of a light string assembly 500 that may be used as the light string assemblies 200 of FIG. 2A or 2B. The light string assembly 500 may be particularly useful for the ceiling lights 140 and the cross-bin lights 142 of FIG. 1. The light string assembly 500 is similar to the light string assembly 400 of FIG. 4. However, the light string assembly 500 is retrofitted onto an existing housing 505 (a portion of which is shown in FIG. 5).

The housing 505 includes a lens assembly 510 that is utilized with conventional LED lighting systems on an aircraft. For example, current aircraft ceiling lights and cross-bin lights take advantage of a collimated beam generated by a polished lens that helps to direct LED light in a desired location. Similarly, the light string assembly 500 having the notch 410 formed therein to provide the point source of light 405 may be disposed in the housing 505 adjacent to the lens assembly 510. The lens assembly 510 may include a highly polished lens 515 that directs the light emitted from the point source of light 405 to provide a collimated beam 520. The lens 515 takes light from the point source of light 405 and throws the light across, up, and back, just like the current configuration.

In other examples of the cabin lighting system 130, the light string 215 as described herein may be utilized in areas of the aircraft cabin that are not simply straight lines of light strings 215, such as the sidewall lights 135, and the ceiling lights 140 and the cross-bin lights 142. For example, where a recessed oval dome ceiling structure is used, and lighting is achieved conventionally with multiple short length lighting fixtures (e.g., about ten inches long) each consisting of a rigid PCB. The short length is required to conform to the dome shape and the curves in the oval. These smaller light fixtures each have their own housing to hold one single PCB, and the smaller lights each need to use the same connector that a longer length light fixture uses. Further, the conventional design has "dark" spots in the oval structure where LEDs on one PCB are spaced apart from other LEDs on another PCB due to the dimensions of the respective PCB's (e.g., individual housing walls for each light fixture are stacked next to each other leaving a gap where no lights reside). Additionally, there is always one set of wire harnesses associated with a light regardless of the length of the light. However, according to examples of the light string 215 as described herein, rigid PCBs along the length of the light are eliminated. Longer length light strings 215 as described herein can bend around the curves in the dome shape in order to illuminate the dome. Replacing the conventional rigid lights in the dome with 40 inch long flexible light strings 215 as described herein equates to twenty-two less connectors and wire harnesses. This results in cost savings as well removing at least 10 pounds of weight in the dome alone. Additionally, the dome structure may be more appealing because there will be less dark spots between the lights, which are caused by stacking of the conventional PCBs.

Aspects of the light string 215 (e.g., the selective light director as described herein) have numerous benefits over conventional lighting systems. In conventional lighting systems, the LEDs need to be very close to each other due to the narrower beam of LEDs as compared to incandescent lighting. To achieve even lighting of an area, LEDs need to be located evenly from each other. And due to the narrower beam of LED bulbs compared to incandescent bulbs, the LEDs need to be very close to each other. These two factors drive the need for an incredibly large number of LEDs— about 3.5 LEDs per inch in the conventional lighting systems. This large number of LEDs requires long PCBs for placement, and complicated circuitry within the PCBs to relay information about each individual LED back to the aircraft's main computer. The PCB boards also add weight to the aircraft. Multiple LEDs may be mounted to a dedicated PCB and one DC power supply is provided for 2-3 PCBs.

Utilization of the onboard power source 145 in the form of an existing AC bus is one improvement over the conventional lighting systems wherein LED's are powered by converting AC to DC power. Conventionally, 2-4 LED fixtures are powered by a single power supply (converting AC to about 2-4 Volts DC). In addition, each power supply generates heat during operation which may impact the surrounding environment. The direct AC connection for the cabin lighting system 130 as described herein eliminates the need for multiple power supplies. This reduces weight and circuitry as well as reducing heat generation within the main cabin 110. According to the cabin lighting system 130 as described herein, the sidewall lights 135, the ceiling lights 140 and/or the cross-bin lights 142 provide for the diffuse spreading of light while simultaneously reducing LED part count and PCB board cost in both the lighting package as well as eliminating the multiple power supplies used in conventional lighting systems.

Cost savings using the cabin lighting system 130 as described herein are immediate and recurring. This is achieved though several benefits of the cabin lighting system 130 as described herein, including running directly off the aircraft bus voltage, drastically increasing the illuminated area per LED, and driving commonality across aircraft programs with a design that is versatile and meets the needs of all programs. Moreover, these lights can be used in many other industries and "cabin" lighting applies to trains, buses, cruise ships, and even buildings.

What is claimed is:

1. A lighting system for an aircraft, comprising:
one or more selective light directors coupled to a fuselage of the aircraft, each of the one or more selective light directors having one or more point sources of light disposed along a length of the selective light director, a circuit board coupled to at least one end thereof, and a light emitting diode directing light into the selective light director, wherein the light emitting diode is adapted to receive alternating current power from an alternating current power source located on the aircraft, and wherein each of the one or more selective light directors include a core surrounded by a cladding, and a reflector region at least partially covering an outer circumferential surface of the cladding.

2. The system of claim 1, wherein each of the one or more selective light directors comprise a light string.

3. The system of claim 1, wherein the reflector region opposes a light emitting region.

4. The system of claim 3, wherein the reflector region surrounds about one-half of a peripheral surface of the one or more selective light directors.

5. The system of claim 1, wherein each of the one or more selective light directors comprise a region where the cladding is removed.

6. The system of claim 2, wherein each of the one or more selective light directors comprise one or more notches formed along the length of the light string.

7. The system of claim 6, wherein the notch comprises a blind hole drilled into the core of the respective selective light director.

8. The system of claim 1, wherein at least one of the one or more selective light directors is disposed within a housing.

9. A lighting system for an aircraft, comprising:
one or more selective light director assemblies positioned in a fuselage of the aircraft, each of the selective light director assemblies comprising:
a selective light director coupled to a circuit board, the selective light director including a core at least partially surrounded by a cladding with a reflective layer at least partially covering a circumferential outer surface area of the cladding and having one or more point sources of light formed along a length of the selective light director; and
a light emitting diode coupled to the circuit board and directing light into the selective light director on at least one end thereof.

10. The system of claim 9, wherein each of the one or more selective light director assemblies comprise a light string.

11. The system of claim 10, further comprising:
an alternating current power source directly connected to each of the circuit boards of the one or more selective light director assemblies.

12. The system of claim 9, wherein at least a portion of the one or more selective light director assemblies comprises a side wall selective light director, a ceiling selective light director and a cross-bin selective light director.

13. The system of claim 10, wherein the light string comprises a reflector region opposing a light emitting region.

14. The system of claim 13, wherein the reflector region comprises a reflective film.

15. The system of claim 13, wherein the reflector region surrounds about one-half of a peripheral surface of the light string.

16. The system of claim 9, wherein at least a portion of the one or more selective light director assemblies are disposed in a housing.

17. The system of claim 16, wherein the housing includes a lens.

18. The system of claim 9, wherein at least one of the one or more point sources of light comprise a notch formed in the respective selective light director.

19. A lighting system for an aircraft, comprising:
a plurality of selective light director assemblies disposed along a length of a cabin, the plurality of selective light director assemblies comprising two side wall selective light directors, a ceiling selective light director and four cross-bin selective light directors, each of the selective light directors being coupled to a circuit board and a light emitting diode which is adapted to receive alternating current power from an onboard alternating current power source, each of the light emitting diodes directing light into the selective light director, wherein at least a portion of the side wall selective light directors comprise a core surrounded by a cladding, and a reflector region at least partially covering an outer circumferential surface of the cladding and the ceiling selective light director and the cross-bin selective light directors comprise one or more point sources of light.

20. The system of claim 19, wherein the selective light directors comprise a light string.

21. The system of claim 9, wherein the light emitting diode is in contact with the core.

22. The system of claim 19, wherein the light emitting diode is in contact with the core.

\* \* \* \* \*